United States Patent
McLaren

(10) Patent No.: US 8,193,914 B2
(45) Date of Patent: Jun. 5, 2012

(54) ADAPTABLE FILTER AND METHOD FOR FILTERING A RADIO FREQUENCY IDENTIFICATION SIGNAL

(75) Inventor: Patrick McLaren, Pembroke Pines, FL (US)

(73) Assignee: Sensomatic Electronics, LLC, Boca Raton, FL (US)

( * ) Notice: Subject to any disclaimer, the term of this patent is extended or adjusted under 35 U.S.C. 154(b) by 1222 days.

(21) Appl. No.: 11/861,549

(22) Filed: Sep. 26, 2007

(65) Prior Publication Data

US 2008/0079545 A1    Apr. 3, 2008

Related U.S. Application Data

(60) Provisional application No. 60/848,183, filed on Sep. 29, 2006.

(51) Int. Cl.
*H04Q 5/22* (2006.01)
(52) U.S. Cl. ...................................... 340/10.2
(58) Field of Classification Search ................. 340/10.2, 340/551; 330/149, 151; 332/159–162; 455/126, 455/307; 348/21; 375/332, 350
See application file for complete search history.

(56) References Cited

U.S. PATENT DOCUMENTS

| | | | |
|---|---|---|---|
| 5,396,657 A | 3/1995 | Jokinen | |
| 5,602,531 A | 2/1997 | Rude et al. | |
| 5,907,820 A * | 5/1999 | Pan | 702/155 |
| 6,215,437 B1 | 4/2001 | Schurmann et al. | |
| 6,236,267 B1 * | 5/2001 | Anzil | 330/149 |
| 6,351,664 B1 * | 2/2002 | Brodnick | 600/509 |
| 6,388,701 B1 * | 5/2002 | Lee | 348/21 |
| 6,947,860 B2 * | 9/2005 | Frederick et al. | 702/72 |
| 2006/0291590 A1 * | 12/2006 | Elahi et al. | 375/332 |
| 2010/0177857 A1 * | 7/2010 | Huttunen et al. | 375/350 |

FOREIGN PATENT DOCUMENTS

DE    4220228 A1    7/1994
WO   WO 2006/055791    5/2006

* cited by examiner

*Primary Examiner* — Brian Zimmerman
*Assistant Examiner* — Kaleria Knox
(74) *Attorney, Agent, or Firm* — Alan M. Weisberg; Christopher & Weisberg, P.A.

(57) ABSTRACT

A method, system and computer program product for filtering a RFID signal. At least one pre-operational interference signal is measured. Amplitude and frequency data are extracted from the at least one measured pre-operational interference signal. At least one filter-dependent parameter is computed based at least in part on the extracted amplitude and frequency data extracted from the measured at least one pre-operational interference signal. A table is generated during a pre-operational mode. The table has at least one set of filter coefficients based on the computed at least one filter-dependent parameter.

23 Claims, 5 Drawing Sheets

ADAPTABLE FILTER AND METHOD FOR FILTERING A RADIO FREQUENCY IDENTIFICATION SIGNAL

CROSS-REFERENCE TO RELATED APPLICATION

This application is related to and claims priority to U.S. Provisional Patent Application Ser. No. 60/848,183, filed Sep. 29, 2006, entitled ADAPTABLE FILTER AND METHOD FOR FILTERING A RADIO FREQUENCY IDENTIFICATION SIGNAL, the entirety of which is incorporated herein by reference.

STATEMENT REGARDING FEDERALLY SPONSORED RESEARCH OR DEVELOPMENT n/a

FIELD OF THE INVENTION

The present invention relates to field of radio frequency identification ("RFID") communications, and more particularly to RFID signal filtering.

BACKGROUND OF THE INVENTION

Radio frequency identification ("RFID") systems are used in a wide variety of applications, and provide convenient mechanisms for the tracking, identification, and authentication of persons or objects. A RFID system typically includes one or more readers (also commonly referred to as interrogators) deployed at selected locations in an installation. Readers are typically deployed where it is desired to control or to receive information about objects or persons bearing or associated with RFID tags. For example, readers may be deployed so as to cover entrances and exits, inventory control points, transaction terminals, and the like. Each reader is capable of receiving information from RFID tags, with each tag typically being associated with an object or person. A tag may be affixed to or embedded in an object with which it is associated, or be part of a badge, card, or token given to a person. Signals conveyed between the tag and the reader allow the reader to sense information on the tag. This information may include, for example, authentication or identification information, or may include instructions, such as a sequence of processes or operations to be conducted upon an object bearing the tag.

Each tag may include stored information that is communicated wirelessly to the reader. Tags typically carry information in onboard memory such as read only memory ("ROM") or nonvolatile programmable memory such as electrically erasable programmable read only memory ("EEPROM") and the amount of information may range from a single bit to kilobits or even more. Single bit tags typically serve as surveillance devices, such as theft prevention tags. Information amounting to a few bits or tens of bits may serve as an identifier, such as may be found in a badge or smart card, while information amounting to kilobits may comprise a portable data file that can be used for identification, communication, or control. The reader may, for example, extract information from a tag and use it for identification, or may store it or convey it to a responsible party. Alternatively, a data file may include a set of instructions that may initiate or control processes or actions without recourse to, or in coordination with, information stored elsewhere.

A tag typically includes a wireless communication device, for example a transmitter or transponder, which is capable of wirelessly communicating stored information to the reader. The tag may communicate the information independently or in response to a signal, such as an interrogation signal, received from the reader. Both active and passive tags are known in the art. An active tag has an onboard power source, while a passive tag may operate without an internal power source, deriving its operating power from a field generated by the reader. Passive tags are much lighter and less expensive than active tags and may offer a virtually unlimited operational lifetime. However, passive tags typically have shorter read ranges than active tags and require a higher powered reader. Passive tags are also constrained in their capacity to store data and their ability to perform well in electromagnetically noisy environments.

A passive tag typically includes memory, which may be read only memory ("ROM"), nonvolatile programmable memory such as electrically erasable programmable read only memory ("EEPROM"), or random access memory ("RAM"), depending on the applications to which the tag is to be put. Programmable memory used by a passive tag should be nonvolatile, so that data is not lost when the tag is in a powered down state. When the tag is not actively communicating with the reader, the tag is in a powered down state.

One commonly used implementation of a passive RFID tag includes analog or digital circuitry for processing signals received from and sent to the reader, as well as a antenna for communicating with a compatible reader, for example by inductive coupling. The antenna may also be referred to as a coil. Communication through inductive coupling typically involves superimposing the data upon a rhythmically varying field or carrier wave, which is, using the data to modulate the carrier wave. The carrier wave may suitably be a sinusoidal wave.

In order to receive data from a passive tag or transponder that communicates through inductive coupling, the reader generates a magnetic field, typically using a reader antenna that inductively couples to the transponder antenna. The magnetic field induces a voltage in the transponder antenna, thereby supplying power to the transponder. Data may suitably be transmitted to the reader by changing one parameter of the transmitting field. This parameter may be amplitude, frequency or phase.

The passive tag communicates with the reader by changing the load on the transmitting field. Load changes may suitably affect either the amplitude or phase of the field. These changes to the field are sensed by the reader antenna, which produces a modulated current in response to the field. This current is analyzed, for example, demodulated, to extract the data, which is then used in ways called for by the design of the particular RFID system.

Most signals received by a reader from the tags are "noisy" signals as these signals are subjected to interference from other tags and transmitting devices as well as other noise in the environment. As a result, typical readers employ filters to "clean up" the noisy signals by removing or eliminating the interference and noise. One such filtering mechanism is the traditional echo/noise filtering method, which is a feedback mechanism which injects a desired or anticipated signal into a summer/mixer device to obtain an error signal to feedback to a least mean squares ("LMS") algorithm. The echo/noise filter is inadequate as it estimates how the desired signal should appear (and thus does not monitor the actual deployment environment) and does not operate in real-time.

There exists, therefore, a need for systems and techniques that will provide real-time filtering and use actual environment measured interference and noise to provide filtering for digital signal processing by a RFID reader and/or radio engine module devices.

SUMMARY OF THE INVENTION

The present invention advantageously provides a method system and computer program product for filtering a radio frequency identification ("RFID") signal.

In accordance with one aspect, the present invention provides a method for filtering an RFID signal in which at least one pre-operational interference signal is measured. Amplitude and frequency data are extracted from the at least one measured pre-operational interference signal. At least one filter-dependent parameter is computed based at least in part on the extracted amplitude and frequency data extracted from the measured at least one pre-operational interference signal. A table is generated during a pre-operational mode. The table has at least one set of filter coefficients based on the computed at least one filter-dependent parameter.

In accordance with another aspect, the present invention provides a system for filtering a RFID signal received from at least on RFID tag. A receiver is arranged to receive the RFID signal from the at least one RFID tag. A processor is in communication with the receiver and filters the received RFID signal. The processor includes a storage device. The processor operates to measure at least one pre-operational interference signal, extract amplitude and frequency data from the measured at least one pre-operational interference signal, compute at least one filter-dependent parameter based at least in part on the amplitude and frequency data extracted from the measured at least one pre-operational interference signal, and generate and store in the memory device during a pre-operational mode, a table having at least one set of filter coefficients based on the computed at least one filter-dependent parameter.

In accordance with still another aspect, the present invention provides a computer program product including a computer usable medium having a computer readable program for an RFID system which when executed on a computer causes the computer to perform a method for filtering a RFID signal in which at least one pre-operational interference signal is measured. Amplitude and frequency data are extracted from the at least one measured pre-operational interference signal. At least one filter-dependent parameter is computed based at least in part on the extracted amplitude and frequency data extracted from the measured at least one pre-operational interference signal. A table is generated during a pre-operational mode. The table has at least one set of filter coefficients based on the computed at least one filter-dependent parameter.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
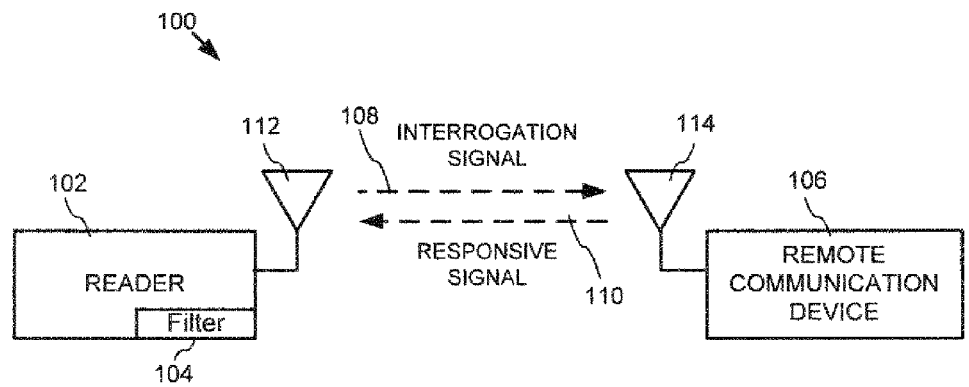
FIG. 1 is a block diagram of a communication system constructed in accordance with the principles of the present invention.

Referring now to the drawing figures in which like reference designators refer to like elements, there is shown in FIG. 1 a diagram of an exemplary system constructed in accordance with the principles of the present invention and designated generally as "100". Communication system 100 provides an electronic identification system in the embodiment described herein. Further, the described communication system 100 is configured for backscatter communications as described in detail below. It is contemplated that other communication protocols can be utilized in other embodiments.

The depicted communication system 100 includes at least one reader 102 having a filter 104 and at least one electronic wireless remote communication device 106. Radio frequency ("RF") communications can occur between a reader 102 and remote communication devices 106 for use in identification systems and product monitoring systems as exemplary applications.

Devices 106 include radio frequency identification ("RFID") devices in the embodiments described herein. Multiple wireless remote communication devices 106 typically communicate with reader 102 although only one such device 106 is illustrated in FIG. 1.

Although multiple communication devices 106 can be employed in communication system 100, there is typically no communication between the multiple communication devices 106 themselves. Instead, the multiple communication devices 106 communicate with reader 102. Multiple communication devices 106 can be used in the same field of reader 102, i.e., within the communication range of reader 102. Similarly, multiple readers 102 can be in proximity to one or more of devices 106.

Remote communication device 106 is configured to interface with reader 102 using a wireless medium in one embodiment. More specifically, communication between communication device 106 and reader 102 occur via an electromagnetic link, such as an RF link, e.g., at microwave frequencies in the described embodiment. Reader 102 is configured to output forward link wireless communication signals 108. Further, reader 102 is operable to receive return link wireless communication signals 110, e.g., a reply signal, from devices 106 responsive to the forward link communication signals 108. In accordance with the above, forward link communication signals and return link communication signals are wireless signals, such as radio frequency signals. Other forms of electromagnetic communication signals, such as infrared, acoustic, and the like are contemplated.

Reader unit 102 includes at least one antenna 112 as well as transmitting and receiving circuitry, similar to that implemented in devices 106. Antenna 112 comprises a transmit/receive antenna connected to reader 102. In an alternative embodiment, reader 102 can have separate transmit and receive antennas.

In operation, reader 102 transmits a forward link communication signal 108, e.g., an interrogation command signal, via antenna 112. Communication device 106 is operable to receive the incoming forward link signal 108. Upon receiving signal 108, communication device 106 responds by communicating the responsive return link communication signal 110, e.g., a responsive reply signal. Communications within system 100 are described in greater detail below.

In one embodiment, responsive return link communication signal 110, e.g., a responsive reply signal is encoded with information that uniquely identifies or labels the particular device 106 that is transmitting so as to identify any object, animal, or person with which communication device 106 is associated. Communication devices 106 can be RFID tags that are attached to objects or people where each tag is programmed with information relating to the object or person to which it is attached. The information can take a wide variety of forms and can be more or less detailed depending on the needs to be served by the information. For example, the information may include merchandise identification information, such as a universal product code. A tag may include identifying information and security clearance information for an authorized person to whom the tag has been issued. A tag may also have a unique serial number, in order to uniquely identify an associated object or person. Alternatively, a tag may include more detailed information relating to an object or person, such as a complete description of the object or person. As a further exemplary alternative, a tag may store a single bit, in order to provide for theft control or simple tracking of entry and departure through the detection of an object or person at a particular reader, without necessarily specifically identifying the object or person.

Remote device 106 is configured to output a reply signal within reply link communication 110 responsive to receiving forward link wireless communication 108. Reader 102 is configured to receive and recognize the reply signal within the reply link communication signal 110, e.g., return signal. The reply signal can be utilized to identify the particular transmitting communication device 106 and may include various types of information corresponding to the communication device 106 including but not limited to stored data, configuration data or other command information.

An exemplary embodiment of a reader 102 is explained with reference to FIG. 2. In this embodiment, the reader 102 has a RF module or unit 200 and a controller module or unit 202. The RF module 200 includes a radio signal source 204 for synthesizing radio frequency signals, e.g., an interrogating RF signal, that outputs a RF signal to transceiver 206 of the reader 102. The interrogating RF signal from the source 204 uses a suitable frequency such as 915 MHz. When the radio signal source 204 is energized, transceiver 206 transmits the interrogating RF signal (typically after the RF signal has been modulated with an information signal) through antenna 112 to a suitable antenna 114 such as a dipole antenna at a communication device 106.

Modulated signals are received from communication device 106 via antenna 112 and passed to transceiver 206. Controller module 202 of reader 102 receives the digital equivalent of the modulated signal. In one embodiment, controller module 202 produces signals in a sequence having a pattern identifying the pattern of the 1's and 0's in read only memory ("ROM") 208 of communication device 106. For example, the received and processed sequence may be compared in reader 102 with a desired sequence to determine whether the object being identified is being sought by reader 102 or not.

Figure 2:
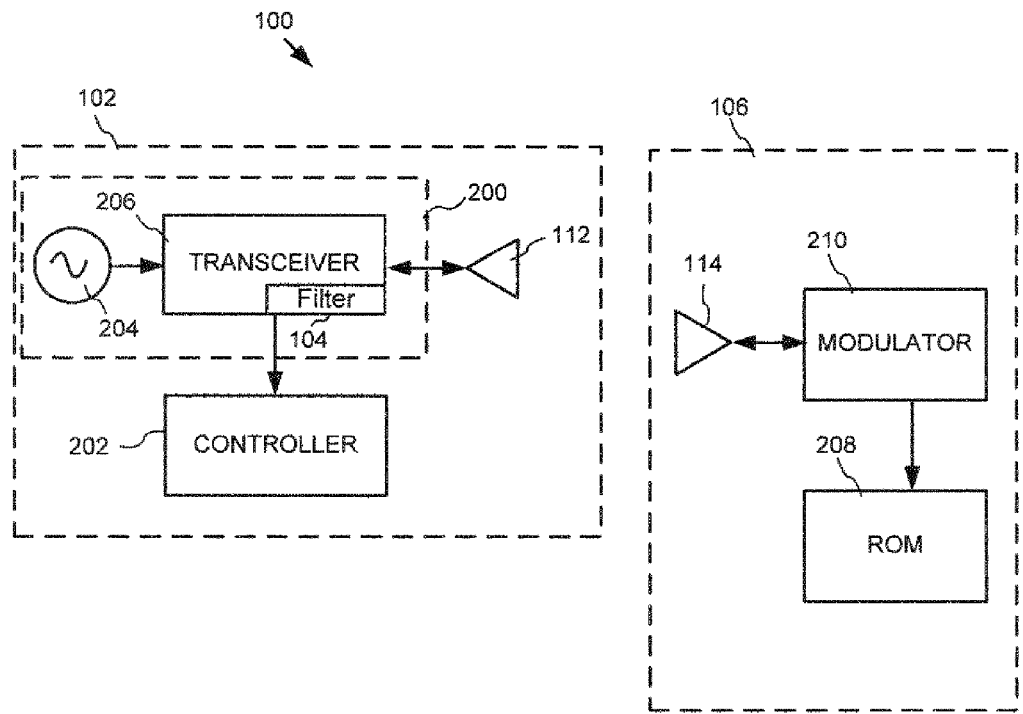
FIG. 2 is a block diagram of various aspects of the communication system of FIG. 1 constructed in accordance with the principles of the present invention.

Continuing to refer to FIG. 2, one embodiment of remote communication device 106 is explained. The depicted communication device 106 includes a modulator 210 having a receiver/transmitter as described below and a data source such as ROM 208, which provides a sequence of binary 1's and binary 0's in an individual pattern to identify the object. In this embodiment, a binary "1" in ROM 208 causes a modulator 210 to produce a first plurality of signal cycles and a binary "0" in ROM 208 causes the modulator 210 to produce a second plurality of signal cycles different from the first plurality of signals. The pluralities of signals cycles are sequentially produced by the modulator 210 to represent the pattern of binary 1's and binary 0's which identify the object are introduced to the dipole antenna 114 for transmission to antenna 112 at reader 102. In another embodiment, the communication device 106 can have separate receive and transmit antennas. Communication device 106 may further include an optional power source (not shown) connected to modulator 210 to supply operational power to modulator 210.

Figure 3:
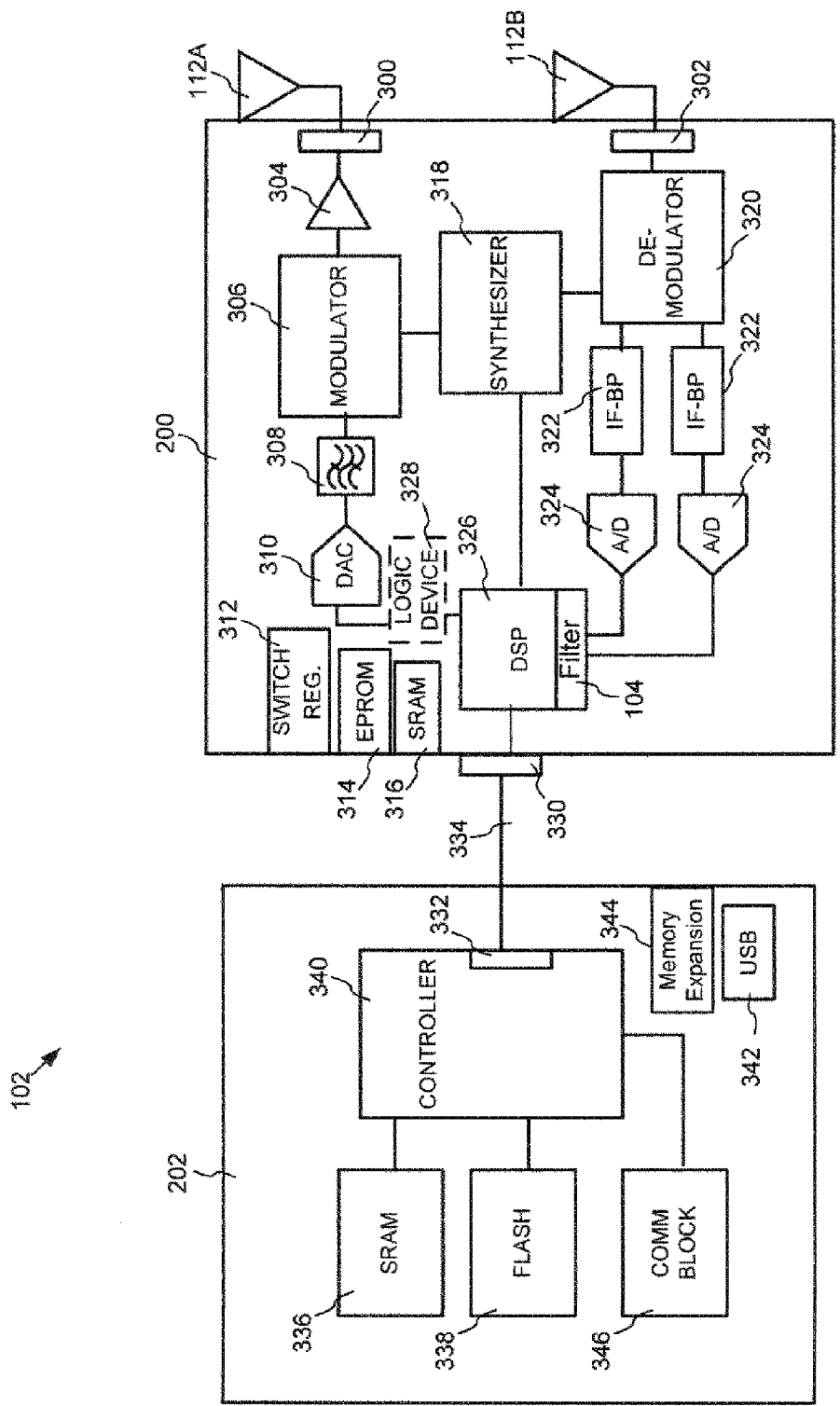
FIG. 3 is a block diagram of the controller processor module and the radio engine module of a communication system constructed in accordance with the principles of the present invention.

The exemplary embodiment of reader 102 in FIG. 2 is described in further detail with reference to FIG. 3. As shown in FIG. 3, the reader 102 includes a RF module or unit 200 and a controller processor module or unit 202. RF module 200 includes a signal-transmitting antenna 112A, a signal-receiving antenna 112B, a first RF interface 300, a second RF interface 302, a power amplifier 304, a modulator 306, a first band pass filter 308, a digital-to-analog converter ("DAC") 310, a switching regulator 312, an erasable programmable read-only memory ("EPROM") 314, a static random access memory ("SRAM") 316, a synthesizer 318, a demodulator 320, second and third band pass filters 322, analog-to-digital converters ("ADC") 324, a digital signal processor ("DSP") 326, an adaptive filter 104, an optional logic device ("LD") 328 and a communication port 330. The synthesizer 318 transmits a reference signal to the modulator 306 and demodulator 320 that can be used to synchronize, filter and/or adjust the received communication signals with the transmitted communication signals. The filter 104 provides for the removal of an interference signal when processing the received communication signals, and is described in greater detail with reference to FIG. 4.

The modulator 306 receives the reference signal from the synthesizer 318 and inquiry data from the DSP 326. Prior to any modulation, DAC 310 converts the inquiry data from the DSP 326 via logic device 328 from a digital signal into an analog signal and provides the converted analog signal to the band pass filter 308, which can restrict a frequency-band of the converted analog signal to a predetermined frequency band. Modulator 306 modulates the reference signal in accordance with the inquiry data, and outputs this modulated signal to the power amplifier 304. Optional logic device 328 can perform a command signal wave-shaping function of the RF module 200 in order to allow the DSP 326 to free up additional processing bandwidth to perform other RF module 200 functions.

Power amplifier 304 amplifies the modulated signal received from the modulator 306, and outputs this amplified signal to the first RF interface 300. Subsequently, signal-transmitting antenna 112A radiates the signal into air as radio-signals. Switching regulator 312 provides for the management of input power to the RF module 200.

Signal-receiving antenna 112B receives radio-signals, and passes the received radio-signals to the demodulator 320 via the second RF interface 302. The demodulator 320 extracts information from the received radio-signals and passes the extracted information signals and received radio-signals to the second and third bandpass filters 322, which may restrict a frequency-band of the extracted information signals and received radio-signals to a predetermined frequency band. The demodulator 320 can function as an I/Q receiver to provide two demodulated outputs which are the "I" output which is a result of product detecting the received signal against an in-phase local oscillator signal, while the "Q" output is a result of product detecting the received signal against a local oscillator signal with a phase shift of 90 degrees. The second and third bandpass filters 322 pass the restricted radio-signals to the analog-to-digital converters 324, which can convert the filtered radio-signals into digital signals for processing by the DSP 326.

Continuing to refer to FIG. 3, controller processor module 202 includes a communication port 332 to interface with communication port 330 of RF module 200 via a wireless or wired communication link 334. Controller processor module 202 further includes a SRAM 336, a flash memory 338, a controller processor 340, a universal serial bus ("USB") 342, a memory expansion module 344 and a communications block 346.

Controller processor 340 can be any of various commercially available central processing units, and it provides the communication and signal processing of controller processor module 202, including the communications with RF module 200 via the communication port 332. Controller processor 340 employs SRAM 336 and flash memory 338 for typical storage of communication data and the like, as well as providing resources for the operating system ("OS"), e.g., Linux/CE, of the controller processor module 202. Of course, the present invention is not limited to such and other forms of non-volatile memory, such as disk drives can be used. Memory expansion module 344 provides for expanding the controller processor module 202 to serve as an application processor. Communications block 346 provides an interface for accessing a communication link to a network, for example an Ethernet link or a wireless link.

Figure 4:
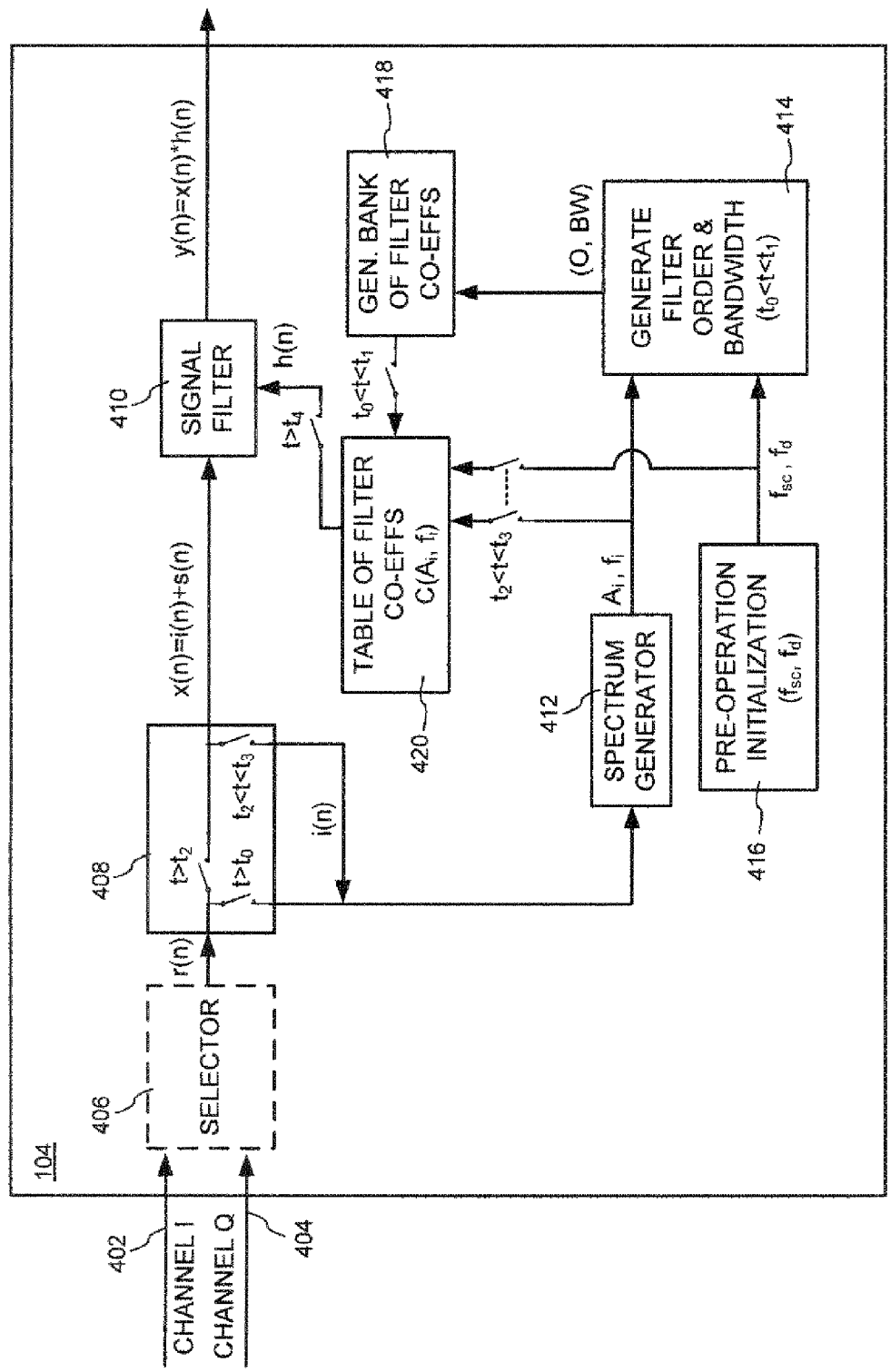
FIG. 4 is a block diagram of an adaptive filter of a digital signal processor for RFID signals in accordance with the principles of the present invention.

FIG. 4 illustrates an exemplary adaptable filter module 104 of the RFID reader 102 constructed in accordance with the present invention. It should be noted that the filter module 104 illustrated in FIG. 4 is an exemplary filter module 104 that is used in a RFID interrogation system of the present invention and the invention disclosed herein is not limited to a particular design or type of filter module 104. It is contemplated that filter module 104 can be implemented in firmware as part of DSP 326 or can be a separate processor-based module performing the functions described herein. Filter module 104 includes a first channel 402, e.g., channel I, and a second channel 404, e.g., channel Q, for receiving signals from the tags and the RFID environment. Optional selector 406 determines which channel 402, 404 has the greater energy level and passes that channel's signal to the switch 408 as signal r(n).

Processing and output activities of the present invention are divided into five time periods whose start times are defined as times $t_0$, $t_1$, $t_2$, $t_3$, $t_4$ and $t_5$ where $0 < t_0 < t_1 < t_2 < t_3 < t_4 < t_5$. The time period from $t_0$ to $t_2$ is referred to herein as the "pre-operation" ("pre-op") period and the time period from $t_2$ to $t_5$ is referred to herein as the "operation" period. Although described below in more detail, the following is a general guideline of the actions occurring within certain time periods. In general, the time period from 0 to $t_0$ is used to select the channel having the greater interference level ("i") for pre-op processing. The time period from $t_0$ to $t_1$ is defined as the period before normal operation and is the time during which interference "i" is acquired and the filter banks are built. As noted above the operation period begins at $t_1$.

The time period from $t_1$ to $t_2$ is used to acquire and select the channel having the greater interference amplitude for normal operation. From $t_2$ to $t_3$, a command is transmitted to the target (tag). This period is also used to acquire an interference ("i") value. The time from $t_3$ to $t_4$ is a silent period during which the tag sets up to transmit its response. The time from $t_4$ to $t_5$ is used to (1) select the appropriate filter parameters based on the current interference amplitude and frequency, and acquire and filter the response from the target tag.

In accordance with one embodiment, r(n) is passed to switch 408. Of note switch 408 is a logical switch used to switch r(n) to other elements of filter 104 during certain time periods. Also, mention is made herein to switching certain signals to filter 104 elements that are not shown as part of switch 408. It is noted that that these other switches are not shown in FIG. 4 as part of switch 408 for ease of explanation, it being understood that the switching and logic fabric of switch 408 can support all or fewer of the switches shown and/or described with reference to FIG. 4.

Referring to FIG. 4, at time $t > t_2$, during the operation period, r(n) is switched and provided to filter signal block 410 as signal x(n) in which x(n)=i(n)+s(n), where i(n) is the interference component of the signal x(n) and s(n) is the signal component. The signal x(n) is filtered by filter signal block 410 to general output signal y(n) where y(n) is the convolution of x(n) with filter h(n).

When time $t > t_0$, switch 408 sends the selected signal r(n) to spectrum generator 412. Spectrum generator processes r(n) to determine the spectrum components of r(n). This can be accomplished, for example, using a Fast Fourier Transform ("FFT"). The spectrum is passed to filter generator 414 in the form of amplitudes A, i.e., $A_i$ for the fundamental amplitude of the interference signal i(n), and frequency f, i.e., $f_i$ for the fundamental frequency component of the interference signal i(n). Filter generator 414 uses these inputs along with those provided by a pre-operation initialization element 416 to generate a filter order "O" at a particular bandwidth "BW". As is explained below in detail, this is done when time $t_0 < t < t_1$.

The pre-operation initialization element 416 provides additional parameters to build the filter bank coefficients, described below in detail. For example. pre-operation initialization element 416 provides a sub-carrier frequency $f_{sc}$, e.g., a Miller sub-carrier, and a raw data rate $f_d$ to the filter generator 414. Filter bank generator 418 uses filter order O and bandwidth BW to generate a bank of filter coefficients. Methods for generating filter coefficient banks given an order O and bandwidth BW are known and not described herein. The bank of filter coefficients is stored in a table of filter coefficients when time $t_2 < t < t_3$. The table of filter coefficients is defined as $C(A_i, f_i)$.

During the operation period when $t_2 < t < t_3$, switch 408 sends the selected signal r(n) to spectrum generator 412. Spectrum generator 412 processes r(n) to determine the spectrum components of r(n), namely $A_i$ and $f_i$. These spectrum components are used as input to table of filter coefficients 420 together with $f_i$, $f_{sc}$ and $f_d$ from 416 to select the appropriate filter coefficients. In addition, when time t is such that $t_2 < t < t_3$, switch 408 passes i(n) to signal filter 410 for filtering at the appropriate time. During this same period of interference acquisition and spectrum generation, the next command to the tag is being transmitted. In other words, interference acquisition and spectrum generation is substantially simultaneous with transmission of a tag command.

Figure 5:
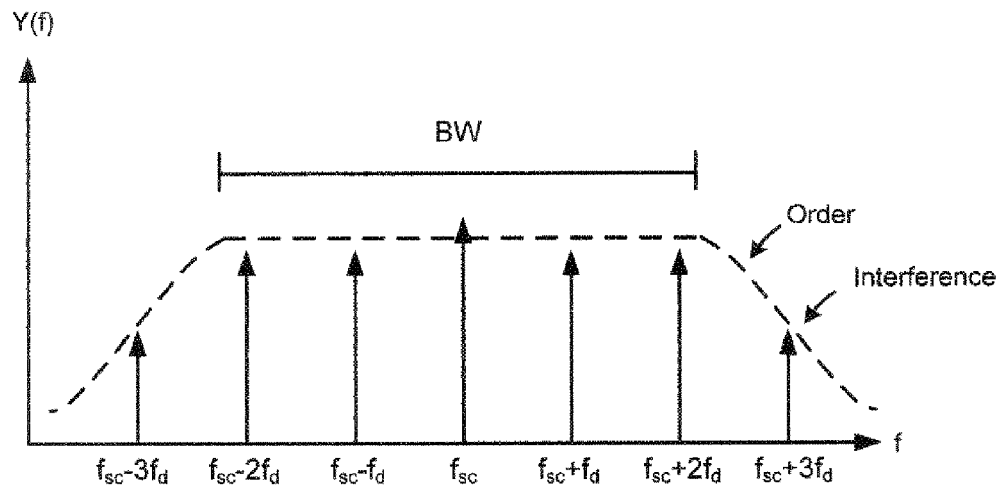
FIG. 5 is a graphic representation of a filtered spectrum y(f) with filter parameters based on interference and a received RFID signal in accordance with the principles of the present invention.

A graphical representation of both O and BW are illustrated in FIG. 5, which shows the filtered spectrum, Y(f) having its filter parameters based on interference signal i(n) and the received selected signal x(n) at the output side of switch 408. As is shown in FIG. 5, BW is centered around $f_{sc}$ with the interference component (i) occurring at $\pm 3f_d$.

Figure 6:
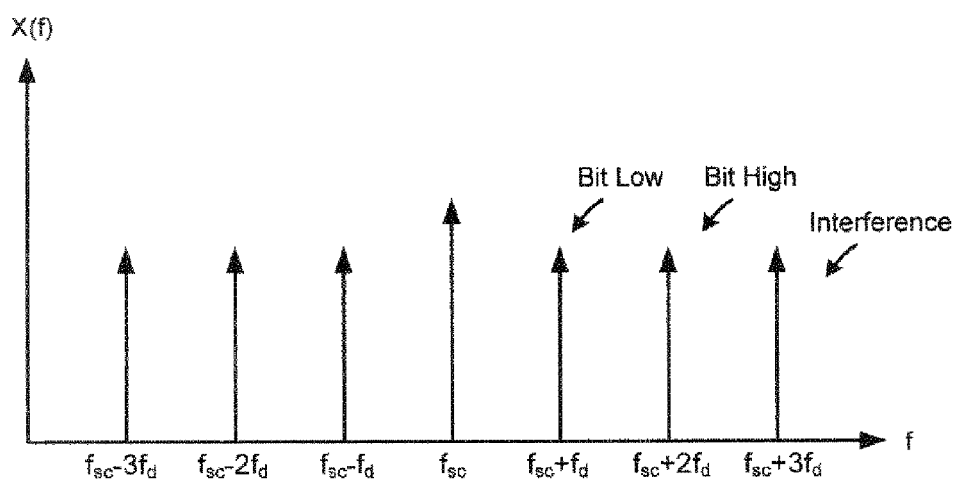
FIG. 6 is a graphic representation of an input spectrum x(f) for a received RFID signal and corresponding interference sidebands in accordance with the principles of the present invention.

FIG. 6 illustrates an exemplary input spectrum for a received signal with a data rate equal to "$f_{sd}$" and using biphase space ("FM0") encoding, where the interference will occur at $3f_{sd}$. For ease of understanding, only the fundamental frequencies are shown in FIG. 6. Once the fundamental subcarrier frequency $f_{sc}$ is identified, the selection of filter values for h(n) is made based on the $f_{sc}$ and the particular interference signal i(n). The O and BW coefficients are used by the filter 410 to minimize or eliminate the sideband frequency interference from the input signal x(n).

Figure 7:
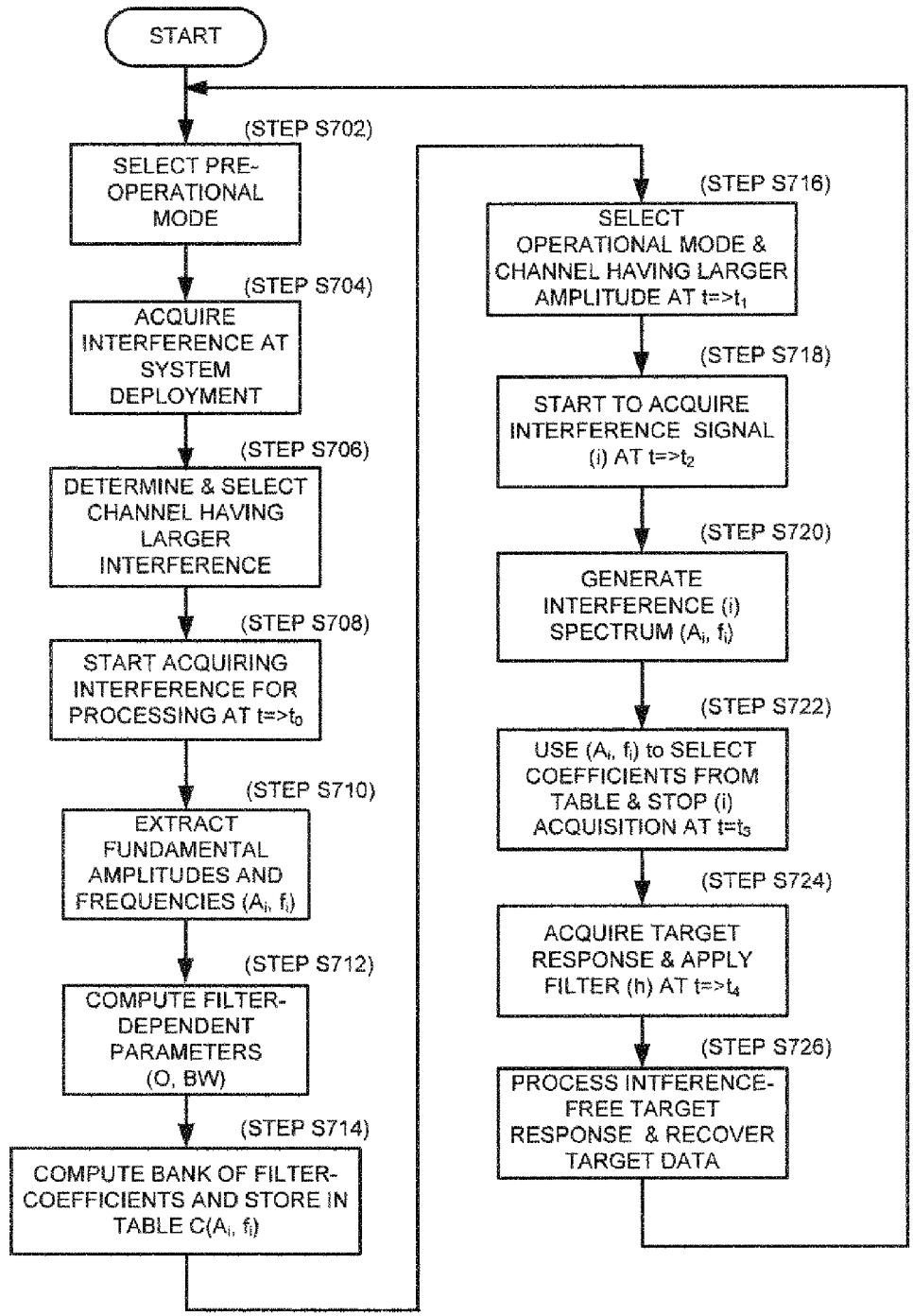
FIG. 7 is a flowchart of a process to adaptively filter a received RFID signal in accordance with the principles of the present invention.

FIG. 7 illustrates an exemplary flowchart of a process to filter a RFID signal according an aspect of the present invention. At step S702, a reader 102 is placed in a pre-operational mode at time t=0 to acquire the interference signal in the deployment environment of the reader 102 (step S704). Filter 104, via selector 406, determines and selects the channel from channel I 402 and channel Q 404 having the larger interference value (step S706). Acquisition of the interference signal component i(n) commences at time $t \geq t_0$ (step S708). Once the interference signal is acquired, spectrum generator 412 extracts the amplitude ($A_i$) and fundamental frequency ($f_i$) of the interference signal i(n) at step S710. The extracted amplitude and fundamental frequency are processed to compute filter-dependent parameters such as O and BW (step S712). At step S714, the bank of filter-coefficients based on O and BW are computed and stored in table 420, thereby completing the pre-operational portion of the inventive method.

At step S716, the reader 102 is placed in the operational mode at time $t \geq t_1$ and one of channel I 402 and Q 404 is selected by selector S406 based on which channel has the larger amplitude. The interference signal "i" is acquired at time $t \geq t_2$ (step S718). The interference spectrum (amplitude ($A_i$) and fundamental frequency ($f_i$) of the interference signal i(n)) is generated at step S720. The amplitude ($A_i$) and fundamental frequency ($f_i$) are used to select the filter coefficients (h) stored in table 420 and interference acquisition is stopped at $t = t_3$ (step S722).

At $t \geq t_4$, the target response is received. Filter (h), based on the stored coefficients is applied (step S724) to generate output y(n). At step S726, the substantially interference-free target response is processed by reader 102 and the data transmitted by the target tag is recovered.

It is noted that many of the functional units described in this specification have been labeled and/or described as modules or elements, in order to more particularly emphasize their implementation independence. For example, a module may be implemented as a hardware circuit comprising custom circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

This invention advantageously provides a method and system for real-time filtering of signals received from RFID target tags and uses actual environment measured interference and noise to provide filtering for digital signal processing by the RFID reader devices. Moreover, the invention provides for an improved way to recalibrate the digital signal processing based on changes to the environment in which the RFID system is deployed.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention.

What is claimed is:

1. A method for filtering a radio frequency identification (RFID) signal, the method comprising:
measuring at least one pre-operational interference signal during a pre-operational mode;
extracting amplitude and frequency data from the at least one measured pre-operational interference signal;
computing at least one filter-dependent parameter based at least in part on the amplitude and frequency data extracted from the measured at least one pre-operational interference signal;
generating, during the pre-operational mode, a table having at least one set of filter coefficients based on the computed at least one filter-dependent parameter;
selecting a set of filter coefficients; and
during an operational mode, measuring the RFID signal received from a target RFID tag and filtering the measured RFID signal using the selected set of filter coefficients.

2. The method of claim 1, wherein measuring the at least one pre-operational interference signal occurs at the site of a RFID system deployment.

3. The method of claim 1 further comprising:
transmitting a command to the target RFID tag during the operational mode; and
measuring at least one operational interference signal during the operational mode,
the transmitting the command and measuring at least one operational interference signal are done substantially simultaneously.

4. The method of claim 3, wherein measuring at least one operational interference signal during the operational mode includes generating an interference spectrum to determine at least one set of interference parameters, the selecting of the set of filter coefficients being based at least in part on the determined at least one set of interference parameters.

5. The method of claim 1, wherein computing at least one filter-dependent parameter is based at least in part on a desired signal data rate for a measured input signal.

6. The method of claim 1, wherein computing at least one filter-dependent parameter includes computing a filter order.

7. The method of claim 1, wherein computing at least one filter-dependent parameter includes computing a cutoff frequency.

8. A system for filtering a radio frequency identification (RFID) signal received from at least one RFID target tag, the system comprising:
a processor, the processor operating to:
measure at least one pre-operational interference signal during a pre-operational mode;
extract amplitude and frequency data from the measured at least one pre-operational interference signal;
compute at least one filter-dependent parameter based at least in part on the amplitude and frequency data extracted from the measured at least one pre-operational interference signal;
generate, during a pre-operational mode, a table having at least one set of filter coefficients based on the computed at least one filter-dependent parameter;
select a set of filter coefficients; and
during operational mode, measure the RFID signal received from the target RFID tag; and
a filter, the filter filtering the measured RFID signal using the selected filter coefficients.

9. The system of claim 8, wherein measuring the at least one pre-operational interference signal occurs at the site of a RFID system deployment.

10. The system of claim 8, wherein the processor further operates during an operational mode to:
transmit a command to the target RFID tag; and
measure at least one operational interference signal, the transmitting the command and measuring at least one operational interference signal are done substantially simultaneously.

11. The system of claim 10, wherein measuring at least one operational interference signal during the operational mode includes generating an interference spectrum to determine at least one set of interference parameters, the selecting of the set of filter coefficients being based at least in part on the determined at least one set of interference parameters.

12. The system of claim 8, wherein computing at least one filter-dependent parameter is based at least in part on the desired signal data rate for a measured input signal.

13. The system of claim 8, wherein computing at least one filter-dependent parameter includes computing a filter order.

14. The system of claim 8, wherein computing at least one filter-dependent parameter includes computing a cutoff frequency.

15. A computer program product comprising a non-transitory computer readable medium having a computer readable program for a radio frequency identification (RFID) system which when executed on a computer causes the computer to perform a method comprising:
measuring at least one pre-operational interference signal during a pre-operational mode;
extracting amplitude and frequency data from the at least one measured pre-operational interference signal;
computing at least one filter-dependent parameter based at least in part on the amplitude and frequency data extracted from the measured at least one pre-operational interference signal;
generating, during a pre-operational mode, a table having at least one set of filter coefficients based on the computed at least one filter-dependent parameter;
selecting a set of filter coefficients;
during an operational mode, measuring an RFID signal received from a target RFID tag; and
filtering the measured RFID signal using the selected set of filter coefficients.

16. The method of claim 15, further comprising:
transmitting a command to the target RFID tag during an operational mode; and
measuring at least one operational interference signal during the operational mode, the transmitting the command and measuring at least one operational interference signal are done substantially simultaneously.

17. The method of claim 15, wherein measuring at least one operational interference signal during the operational mode includes generating an interference spectrum to determine at least one set of interference parameters, the selecting of the set of filter coefficients being based at least in part on the determined at least one set of interference parameters.

18. The method of claim 4, wherein the at least one set of interference parameters includes at least one of interference signal amplitude and interference signal frequency.

19. The system of claim 11, wherein the at least one set of interference parameters includes at least one of interference signal amplitude and interference signal frequency.

20. The method of claim 17, wherein the at least one set of interference parameters includes at least one of interference signal amplitude and interference signal frequency.

21. The method of claim 4, further comprising:
storing, during the pre-operational mode, the table having at least one set of filter coefficients, the stored filter coefficients in the table being unchanged during the operational mode.

22. The system of claim 11, further comprising:
a memory, the memory storing, during the pre-operational mode, the table having at least one set of filter coefficients, the stored filter coefficients in the table being unchanged during the operational mode.

23. The method of claim 15, further comprising:
storing, during the pre-operational mode, the table having at least one set of filter coefficients, the stored filter coefficients in the table being unchanged during the operational mode.

* * * * *